United States Patent [19]
Pottebaum et al.

[11] 3,898,436
[45] Aug. 5, 1975

[54] COIL DIAMETER CONTROL SYSTEM

[75] Inventors: Raymond J. Pottebaum, Middletown; David L. Williamson, Franklin; Wayne L. Sink, Middletown, all of Ohio

[73] Assignee: Armco Steel Corporation, Middletown, Ohio

[22] Filed: Mar. 22, 1974

[21] Appl. No.: 453,676

[52] U.S. Cl....... 235/92 DN; 235/92 CA; 235/92 R; 235/151.32; 242/75.51
[51] Int. Cl.................... H03k 21/36; G06f 15/46
[58] Field of Search ..... 235/92 DN, 92 CA, 92 MP, 235/92 CC, 103.5 R, 103, 151.32; 340/271; 242/57, 75.51, 78.1; 72/30

[56] References Cited
UNITED STATES PATENTS

| | | | |
|---|---|---|---|
| 3,538,729 | 11/1970 | Sterrett | 235/92 DN |
| 3,663,806 | 5/1972 | Drankhan et al. | 235/151.32 |
| 3,710,084 | 1/1973 | Slagley et al. | 235/151.32 |
| 3,834,648 | 9/1974 | Rose et al. | 235/92 CA |

*Primary Examiner*—Joseph M. Thesz, Jr.
*Attorney, Agent, or Firm*—Melville, Strasser, Foster & Hoffman

[57] ABSTRACT

Coil Diameter Control System for controlling strip coiling apparatus whereby rotation of the coiling mandrel is automatically and precisely terminated upon the attainment of a preselected coil diameter wound about the mandrel. The invention can be utilized to precisely terminate mandrel rotation both when the mandrel is operating in a coil build-up mode or when it is functioning as a pay-off device in an uncoiling operation.

5 Claims, 2 Drawing Figures

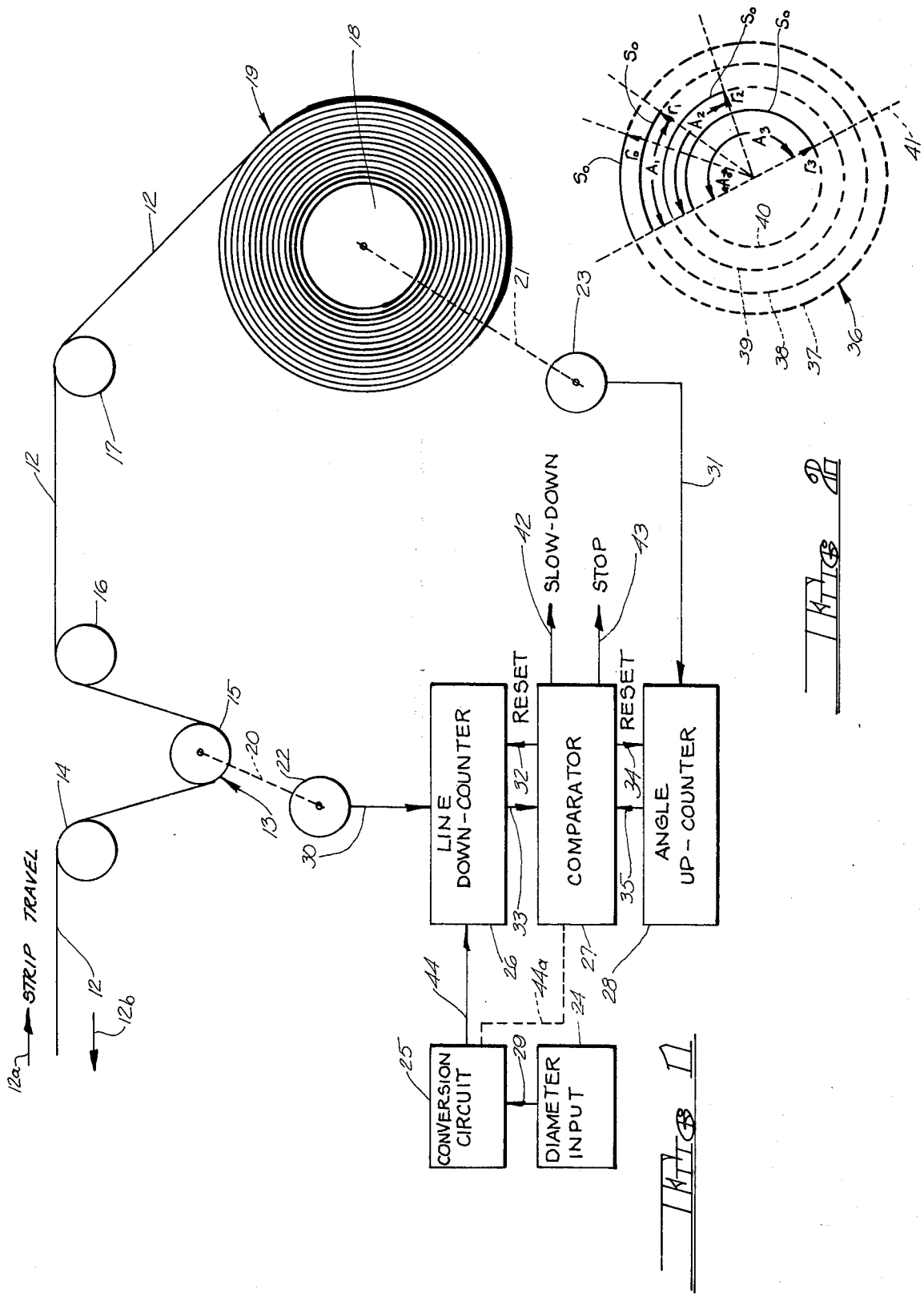

COIL DIAMETER CONTROL SYSTEM

BACKGROUND OF THE INVENTION

1. Field of the Invention

Although not limited thereto, the present invention is particularly adapted for use with continuous strip rolling mills. In such mills the strip is continuously fed through a bridle apparatus and thence about a positioning roll to a coiler where it is wound into coils for shipment or further processing. Since such strip material is often ordered from the supplier thereof on a weight basis, it is necessary to convert the weight of material so ordered to a related coil diameter. Thereafter, in order to insure that the exact weight specified is actually delivered, it is necessary to precisely monitor the diameter of the coil as it builds up on the coiler mandrel and to stop such build up precisely when the appropriate coil diameter has been achieved. That is, the resultant coil diameter on the coiler mandrel must be precisely controllable in order to insure that it will be substantially in accordance with a preselected coil diameter. Similarly, it is often desirable to monitor the diameter of a coil on a pay-off reel as it unwinds from the coiler mandrel and to be able to stop the unwinding process precisely when a preselected coil diameter has been attained.

2. Description of the Prior Art

The prior art discloses several methods by which coil diameter on a build up roll may be measured or monitored. One of the methods disclosed by the prior art, such as disclosed in U.S. Pat. No. 2,466,977, teaches the use of mechanical devices which come in direct contact with the coil. The main disadvantage associated with the prior art mechanical coil diameter measurement is that, in general, on a continuous line, the line must be stopped each time a measurement is to be made.

The prior art also discloses methods by which to measure build up coil diameter which do not involve mechanical devices. See, for example, U.S. Pat. No. 3,151,507. However, in general, the accuracy of the prior art non-mechanical coil diameter measurement methods are dependent upon line speed. That is, measurement accuracy will vary in respect to variations in the speed of the feed line.

SUMMARY OF THE INVENTION

It is an object of the present invention to provide an automatic control system for strip coiling apparatus which insures that the coiling operation will be precisely terminated upon the attainment of a preselected diameter of the coil wound about its mandrel.

More specifically, it is an object of the present invention to provide an automatic control system for a rolling mill coiler which will continuously monitor the diameter of a coil either as it builds up on a tension reel or unwinds from a pay-off reel and will slow down and stop the strip line at preselectable coil sizes. Control functions are accomplished by a unique technique of comparing pertinent arc lengths and angles, such parameters being essentially independent of line speed.

In accordance with the invention, comparator logic means, containing two angle presets, is provided, the first angle preset controlling the generation of a coil slow down signal and the second a coil stop signal. In addition, diameter input means is provided by which an operator can input a preselected coil diameter, representing the desired strip material weight, into the control system. The preselected coil diameter, in accordance with its relation to the stop angle preset of the comparator logic means, is converted into a radian measurement representing an arc length equivalent of the preselected coil diameter. The arc length value is used to preset a line down counter which is associated with a first pulse generator adapted to reflect strip travel past a bridle means. Also provided is an angle up-counter which counts pulses proportional to the number of revolutions of the coiler mandrel from a second pulse generator associated with the coiler mandrel.

Upon initiation of a coiling or uncoiling process, the line down-counter will begin counting down due to the line pulses input from the first pulse generator. On the "zero" count, which represents strip passage past the bridle means of one preselected diameter arc length equivalent, a pulse from the line down-counter will enable a comparator check on the angle up-counter against the two angle presets in the comparator logic means. The count on the angle up-counter, when the comparison is made, represents the angle then subtending the preselected diameter arc length equivalent on the coil since it counts pulses proportional to the number of revolutions of the coiler mandrel, which reflect the extent of rotation thereof, for a period of time equivalent to the passage of one preselected diameter arc length equivalent past the bridle means.

If a comparison is not satisfied, the comparator logic means resets both counters and an identical procedure is repeated thereafter. Thus, the angle subtended by the preselected diameter arc length equivalent on the coil is continuously monitored and compared to the two comparator logic means angle presets. When either the slow down or the stop angle presets is satisfied, an appropriate output control signal will be generated.

It will be obvious to one skilled in the art that, as the coil diameter builds up on the mandrel, the subtended angle monitored by the angle up-counter will decrease at a proportional rate. Similarly, as coil diameter is reduced on a pay-off reel, the subtended angle monitored by the angle up-counter will increase at a proportional rate. By providing means for continuously monitoring these constantly decreasing and increasing subtended angles, and by comparing them to appropriately preset angles, precision control over the coiling operation is possible.

The above and other objects and features of the invention will become apparent from the following detailed description taken in connection with the accompanying drawings which form a part of this specification.

BRIEF DESCRIPTION OF THE DRAWINGS

FIG. 1 is a schematic circuit diagram illustrating the control system of the present invention.

FIG. 2 is a graphical depiction, in polar format, of the operation of the control ysstem in accordance with the invention as shown in FIG. 1.

DESCRIPTION OF THE PREFERRED EMBODIMENTS

With reference now to the drawings, and particularly to FIG. 1, the control system of the present invention is schematically illustrated in association with a rolling mill coiling operation. It will be noted that the strip material 12, as it comes from the rolling mill (not shown)

in a direction indicated by arrow 12a, initially passes through a bridle means, generally shown at 13, comprising rollers 14, 15 and 16. After the strip material is threaded through rollers 14, 15 and 16 it passes about positioning roller 17 whereupon it is coiled about mandrel 18 as generally shown at 19.

Interface between the strip coiling apparatus described above and the control system of the present invention is accomplished by control lines 20 and 21. Control line 20 connects roller 15 of bridle means 13 to pulse generator 22. Similarly, control line 21 connects mandrel 18 to pulse generator 23. So connected, pulse generator 22 will output pulses reflecting strip travel past roller 15 and pulse generator 23 will output pulses proportional to the extent of rotation of mandrel 18.

Diameter input means, generally shown at 24, provides the interface between the station operator and the control system. Diameter input means 24 can comprise any of a number of well known devices whereby a manual selection of input parameters can be converted into a representative digital signal.

The internal logic functions of the control system of the present invention are accomplished by conversion circuit 25, line down-counter 26, comparator 27 and angle up-counter 28. Conversion circuit 25 interfaces with diameter input means 24 through control line 29; line down-counter 26 interfaces with pulse generator 22 through control line 30 and angle up-counter 28 interfaces with pulse generator 23 through control line 31. Comparator 27 makes connection with line down-counter 26 by control line 33 and reset line 32 and with angle up-counter 28 by control line 35 and reset line 34.

A description of the operation of the control system shown in FIG. 1 will now be undertaken with specific reference to FIG. 2 which is a diagramatic representation of a coil 36. Specific convolutions of coil 36 are shown by dotted lines 37, 38, 39 and 40. A base or reference line is shown by the dotted line 41. Although the following detailed description relates generally to a coil build up control system, identical considerations apply also to a pay-off reel control system.

Prior to initiating operation of the control system three preselected values must be preset into the system. The first two presets are angle presets $A_0$ and $A_1$ which must be set into the logic of comparator 27. As shown in FIG. 2, angle preset $A_1$ will be somewhat larger than angle preset $A_0$. Angle preset $A_1$ is the control parameter initiating station slow down by causing a control signal to be generated on control line 42 and angle preset $A_0$ is the control parameter for initiating station stop by causing a control signal to be generated on control line 43. The remaining required preset is the desired coil diameter, represented by radius $R_0$ in FIG. 2, which is input into the control system by means of diameter input means 24.

As shown in FIG. 1, the preselected diameter preset is applied by diameter input means 24 to conversion circuit 25. Conversion circuit 25 converts the preselected diameter preset into an equivalent arc length $S_0$ by the following relationship: $S_0 = D_0 A_0/2$; where $D_0$ represents the preselected diameter preset and $A_0$ is established through the association of conversion circuit 25 with comparator 27 as shown by dotted line 44a. The arc length $S_0$ is applied through control line 44 to preset line down-counter 26 at arc length $S_0$. When mandrel 18 begins rotating and thereby drawing strip 12 through bridle means 13, roller 15 will cause pulse generator 22 to transmit pulses along control line 30 to line down-counter 26. Line down-counter 26 will thereby begin counting down from $S_0$ towards a zero count. At the same time, the rotation of mandrel 18 will cause pulse generator 23 to transmit pulses to angle up-counter 28 along control line 31. The count accumulated by angle up-counter 28 will represent angular rotation of mandrel 18 since pulse generator 23 outputs a constant number of pulses per revolution of mandrel 18.

When a length of strip 12 equivalent to arc length $S_0$ has past roller 15 in a direction indicated by arrow 12a, line down-counter 26 will attain a zero count due to pulse inputs from pulse generator 22 along control line 30. On the zero count, line down-counter 26 will enable comparator 27 by an enabling pulse along control line 33. Enabled comparator 27 will perform a comparison check of the angle represented by the count accumulated in angle up-counter 28 against the slow down angle preset $A_1$ and the stop angle preset $A_0$. If a comparison of angle preset $A_1$ is satisfied, comparator 27 will output an appropriate control signal on control line 42. If a comparison is not satisfied, comparator 27 resets line down-counter 26 to $S_0$ and angle up-counter 28 to a zero count by pulse signals along reset line 32 and 34 respectively, and the aforementioned comparison procedure is repeated after another length of strip 12 equivalent in length to $S_0$ has passed roller 15. After angle preset $A_1$ is satisfied, repetition of the comparison procedure is continued until a comparison with angle preset $A_0$ is satisfied, whereupon comparator 27 generates a stop control signal along control line 43 stopping rotation of mandrel 18. At this time, the coil 19 built up on mandrel 18 will be precisely the preselected diameter $D_0$ originally preset on diameter input means 24.

As will be noted, comparator 27 samples the count accumulated at angle up-counter 28 once each period of time represented by the coiling of a length of strip $S_0$ on coil 19. Therefore, the angle represented by the count accumulated by angle up-counter 28 will be the angle subtended by strip length $S_0$ on coil 19 for a particular coil radius. Since strip length (or equivalently, arc length) $S_0$ remains constant, as coil radius increases, the angle subtending $S_0$ will proportionately decrease. When this decreasing angle, i.e., the angle represented by the count on angle up-counter 28, coincides with either angle preset $A_0$ or angle preset $A_1$, comparator 27 will output an appropriate control signal either on control line 42 or control line 43 which will either slow down mandrel 18 or completely stop it. In other words, when coil 19 is sufficiently built up so that arc length $S_0$ subtends either angle preset $A_0$ or angle preset $A_1$, comparator 27 will generate and transmit appropriate control signals.

An example of the operation of the control system of the present invention will now be undertaken with specific reference to FIG. 2. As described above, the initial step in the operation of the control system is to preset angle presets $A_0$ and $A_1$ into the logic of comparator 27. Next, the preselected diameter, represented by $R_0$ in FIG. 2, is preset into diameter input means 24 whereupon it is converted into an arc length $S_0$ and used to preset line down-counter 26. For purposes of this exemplary discussion, it will be assumed that comparator 27 samples angle up-counter 28 at coil convolutions 40, 39, 38 and 37 respectively.

Thus, as coil 36 builds up, comparator 27 will first sample angle up-counter 28 at a coil size represented by coil convolution 40. At coil convolution 40, arc length $S_0$ subtends angle $A_3$ as represented by an appropriate count on angle up-counter 28. As can be seen from FIG. 2, angle $A_3$ is larger than either angle $A_0$ or angle $A_1$ and therefore, comparator 27 will reset both line down-counter 26 and angle up-counter 28 and perform another comparison when the instantaneous coil diameter increases to the point represented by coil convolution 39. It will incidentally be noticed from FIG. 2 that $R_3$, the coil radius representing coil convolution 40, is in fact smaller than the desired coil radius $R_0$. The identical procedure is repeated at coil convolution 39 wherein angle $A_2$ subtending arc length $S_0$ is again noted to be larger than either preset angle $A_0$ or preset angle $A_1$. Therefore, comparator 27 will similarly reset line down-counter 26 and angle up-counter 28 and perform another comparison at coil convolution 38. It should again be noted that $R_2$ is in fact again smaller than $R_0$. As noted, the next sampling of angle up-counter 28 by comparator 27 occurs at coil convolution 38. Since, on coil convolution 38, arc length $S_0$ subtends angle preset $A_1$, a slow down condition comparison is satisfied. Therefore, comparator 27 will output a slow down control signal along control line 42 and again reset line down-counter 26 and angle up-counter 28. The next sampling of angle up-counter 28 by comparator 27 will occur at coil convolution 37. Arc length $S_0$ on coil convolution 37 subtends angle preset $A_0$ and therefore, a stop comparison is satisfied. The stop comparison will cause comparator 27 to output a stop control signal along control line 43 thereby terminating rotation of mandrel 18. It will be noted, that at subtended angle preset $A_0$ the radius of coil 36 is precisely equal to the preselected coil radius $R_0$.

It will be apparent to those skilled in the art that the control system described herein may also be utilized to continuously monitor the diameter of a coil as it is unwound from a pay-off reel and to slow down and stop rotation of the pay-off reel at preselectable coil sizes. Control functions are accomplished in a manner identical to that described with respect to monitoring coil diameter as it is built up on a tension reel; the only variance being that the two angle presets $A_0$ and $A_1$ will represent different values.

As an example of the operation of the control system of the present invention to monitor coil diameter on a pay-off reel, assume, with reference to FIG. 2, that the unwinding operation is desired to be terminated when the coil diameter is equivalent to radius $R_3$ and that a mandrel rotation slow down signal is desired to be developed at a coil diameter equivalent to radius $R_2$. In accordance therewith, comparator 27 is preset with stop angle preset $A_3$ and with slow down angle preset $A_2$. Also the preselected coil diameter, represented by $R_3$, is preset into diameter input means 24 whereupon it is converted into arc length $S_0$ which is used to preset line down-counter 26. Arc length $S_0$ is defined by the relationship $S_0 = R_3 A_3$. As previously indicated, it will be assumed that comparisons are accomplished at coil convolutions 37, 38, 39 and 40.

Upon the accomplishment of the above presets, operation of the control system is essentially identical to that previously described. Thus, after the passage of a length of strip material 12, in a direction indicated by arrow 12b, equivalent to arc length $S_0$, comparator 27 will make an initial comparison at a coil size represented by coil convolution 37. At coil convolution 37, arc length $S_0$ subtends angle $A_0$ as represented by an appropriate count on angle up-counter 28. As can be seen from FIG. 2, angle $A_0$ is smaller than either stop angle preset $A_3$ or slow down angle preset $A_2$ and therefore, comparator 27 will reset both line down-counter 26 and angle up-counter 28 and perform another comparison when the coil diameter decreases to the point represented by coil convolution 38.

An identical procedure is repeated at coil convolution 38 wherein angle $A_1$ subtending arc length $S_0$ is again noted to be smaller than either angle preset $A_3$ or angle preset $A_2$. In a similar manner, comparator 27 performs its next comparison at coil convolution 39 wherein a slow down condition is satisfied since arc length $S_0$ subtends angle preset $A_2$. The next comparison occurs at coil convolution 40 wherein arc length $S_0$ subtends angle preset $A_3$ whereupon a stop condition is satisfied. The stop comparison will cause comparator 27 to output a stop control signal along control line 43 thereby terminating rotation of mandrel 18. It will be noted, that at subtended angle preset $A_3$, the radius of coil 36 is precisely equal to preselected coil radius $R_3$.

For personnel and equipment safety purposes, it has been discovered that a useful modification to the control system includes making the generation of a stop signal by comparator 27 dependent upon the prior generation of a slow down signal. That is, comparator 27 must generate a slow down signal at control line 42 before it will be allowed to generate a stop signal along control line 43. Making the slow down signal permissive with respect to the stop signal can easily and conveniently be accomplished by incorporating appropriate and well known circuitry in comparator 27.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that variations of the digital components shown in block form in FIG. 1 could be combined into one logic chip.

The embodiments of the invention in which an exclusive property or privilege is claimed are defined as follows:

1. In an apparatus of the type in which strip material passes a bridle means and a rotating mandrel about which it is wound and unwound, having the improvement for automatically stopping the rotation of said mandrel and the coil wound thereon when a preselected coil diameter has been achieved, said improvement comprising:

a. comparator logic means and at least one angle preset, said comparator logic means adapted to receive input angle data, to compare said input angle data to said angle preset upon receipt of a comparison enabling signal, to respond with first and second output reset signals when said comparison is not satisfied and to respond with output control signals when said comparison is satisfied;

b. input interfacing means associated with said angle preset for establishing said preselected coil diameter, said preselected coil diameter defining in conjunction with said angle preset, a preselected coil diameter arc-length equivalent;

c. down-counting means communicating with said input interface means and preset thereby at said preselected coil diameter arc-length equivalent, said down-counting means adapted to generate and transmit said comparison enabling signal to said comparator logic means upon achievement of a zero count and to thereafter be reset to said preselected coil diameter arc-length equivalent by said first reset signal from said comparator logic means.

d. first pulse generating means in association with said bridle means, said first pulse generating means transmitting pulses to said down-counting means reflecting strip travel past said bridle means;

e. second pulse generating means in association with said mandrel, said second pulse generating means outputting pulses proportional to the rotation of said mandrel; and f. up-counting means adapted to count said output pulses from said second pulse generating means, said count representing the angle subtended by said preselected coil diameter arc-length equivalent as wound into a coil upon said mandrel, to continuously apply said count to said logic comparator means, and to be reset by said second reset signal; whereby, said comparator logic means compares said angle preset to said count representing said subtended angle upon enablment by said comparison enabling signal, said comparator logic means repetitively resetting said downcounting means and said up-counting means until said comparison is satisfied whereupon, said comparator logic means initiates said output control signal for terminating mandrel rotation.

2. The improved coil diameter control system described in claim 1, wherein said comparator logic means includes two angle presets; a satisfactory comparison of said first angle preset with respect to said count representing said subtended angle causing said comparator logic means to initiate a first output control signal for slowing down rotation of said mandrel, a satisfactory comparison of said second angle preset with respect to said count representing said subtended angle causing said comparator logic means to initiate a second output control signal for terminating mandrel rotation, said second angle preset also defining, through its relationship with said preselected coil diameter, said preselected coil diameter arc-length equivalent.

3. The improved coil diameter control system described in claim 2, wherein said initiation of said second output control signal is dependent upon prior initiation of said first output control signal.

4. The improved coil diameter control system described in claim 1, wherein said count representing said angle subtended by said preselected coil diameter arc-length equivalent upon said receipt of said enabling signal by said comparator logic means, repetitively decreases until comparison with said angle preset is satisfied whereupon said coil has been wound to said preselected coil diameter.

5. The improved coil diameter control system described in claim 1, wherein said count representing said angle subtended by said preselected coil diameter arc-length equivalent upon said receipt of said enabling signal by said comparator logic means, repetitively increases until said comparison with said angle preset is satisfied whereupon said coil has been unwound to said preselected coil diameter.

* * * * *